Jan. 20, 1925.
E. F. PRINDLE
WIRE HANDLE FOR RECEPTACLES
Filed Feb. 25, 1924
1,523,896
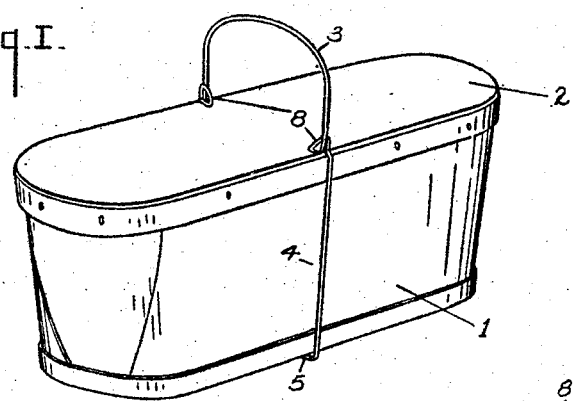
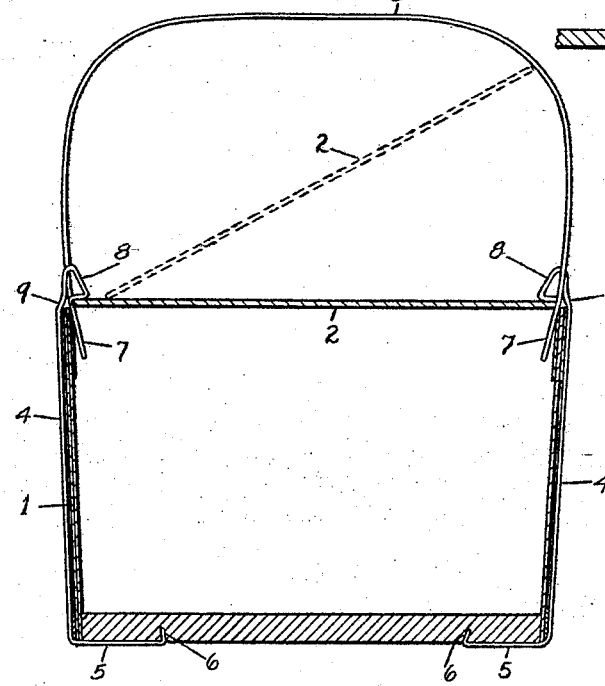
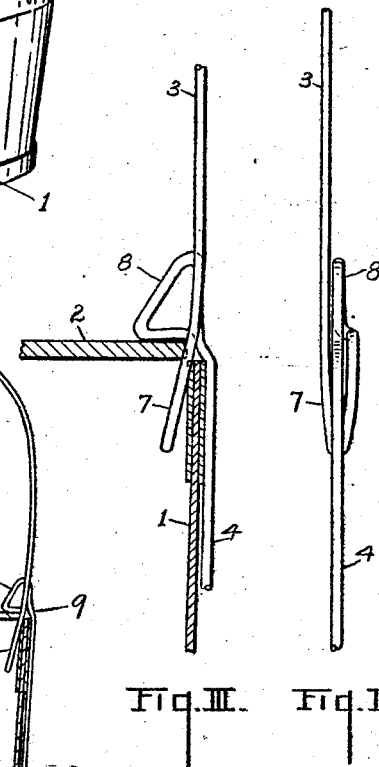
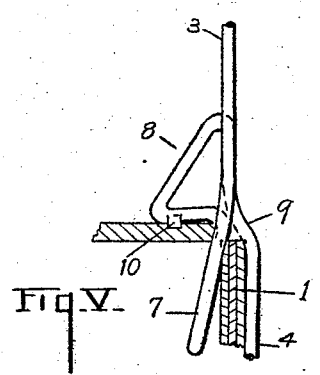
INVENTOR
Eugene F. Prindle
BY
Chappell & Earl
ATTORNEYS Patented Jan. 20, 1925.

1,523,896

UNITED STATES PATENT OFFICE.

EUGENE F. PRINDLE, OF LAWTON, MICHIGAN.

WIRE HANDLE FOR RECEPTACLES.

Application filed February 25, 1924. Serial No. 694,888.

*To all whom it may concern:*

Be it known that I, EUGENE F. PRINDLE, a citizen of the United States, residing at Lawton, county of Van Buren, State of Michigan, have invented certain new and useful Improvements in Wire Handles for Receptacles, of which the following is a specification.

This invention relates to improvements in wire handles for receptacles.

The main object of this invention is to provide an improved handle which may be readily engaged with a basket or box or like receptacle without the aid of tools and is also adapted for a cover retaining means.

A further object is to provide an improved handle which securely engages the receptacle and retains the cover, at the same time permitting the easy engagement and disengagement of the cover.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a perspective view of a basket with the cover thereon embodying the features of my invention.

Fig. II is a vertical transverse section through the basket shown in Fig. I, one of the steps in introducing the cover being shown by dotted lines.

Fig. III is an enlarged detail section showing structural details.

Fig. IV is an enlarged detail side elevation of the handle showing the structure thereof.

Fig. V is an enlarged detail of a slightly modified construction.

In the drawing similar reference characters refer to similar parts throughout the several views.

Referring to the drawing, the receptacle 1 illustrated is of the basket type commonly used for marketing fruit and is provided with the usual cover 2. The handle 3 is formed of wire and is of general U-shape, the ends of its arms 4 being turned inwardly at 5 to engage the bottom of the receptacle and terminate in up-turned prongs 6. These prongs are slightly inclined so that any pull on the handle tends to embed them into the bottom.

The arms of the handle have longitudinally disposed elongated loops 7 therein providing receptacle engaging fingers, these fingers being engaged within the rim of the receptacle. At the upper ends or bases of these loops 7 are transverse triangularly disposed inwardly projecting loops 8 adapted to engage the cover 2, these cover engaging loops being disposed with their bases downwardly and their apexes in a plane of the arms of the handle, as illustrated, so that one edge of the cover may be engaged under one of the loops and pressed downwardly over the other causing the handle to spring outwardly and permitting the loops to snap over the other edge of the cover.

The arms are provided with outward offsets 9 in opposed relation to the upper ends of the finger loops 7 so that the upper edge of the receptacle is resiliently clamped by the fingers and the arms, downward movement of the handle, such as might disengage it from the bottom being effectively prevented.

In engaging the handle with the receptacle, it is only necessary to place the same astride the receptacle with the fingers within the rim of the receptacle and push downwardly until the inturned ends 5 swing under the receptacle.

The prongs 6 engage sufficiently to retain the handle without driving them in and the load when lifting and setting the receptacle down tends to embed the prongs.

With the parts thus arranged, the handle may be engaged without the aid of tools, is very securely retained and held in an upright position, and effectively retains the cover.

In the modification shown in Fig. V, the basket retaining loops are provided with lugs 10 which are formed by upsetting the metal of the cover engaging loops.

My improved handle is quite economical to produce and may be very rapidly applied to the receptacle and is effective in retaining the cover.

Having thus described my invention, what I claim as new and desire to secure by Letters Patent is:

1. The combination with a receptacle and cover, of a resilient U-shaped handle, the arms of which have inturned ends terminating in up-turned prongs engaging the bottom of the receptacle, said arms having elongated longitudinally disposed loops therein providing fingers engaging within the rim of the receptacle and triangular transversely disposed inwardly projecting cover engaging loops at the bases of said fingers, said cover engaging loops being disposed with their bases downwardly and their apexes approximately in the plane of the arms of the handle facilitating the engagement of the cover therewith, said arms having outward offsets therein at the bases of said fingers coacting therewith to clamp the rim of the receptacle.

2. The combination with a receptacle and cover, of a resilient U-shaped handle, the arms of which have enolgated longitudinally disposed loops therein providing fingers engaging within the rim of the receptacle and triangular transversely disposed inwardly projecting cover engaging loops at the bases of said fingers, said cover engaging loops being disposed with their bases downwardly and their apexes approximately in the plane of the arms of the handle facilitating the engagement of the cover therewith.

3. The combination with a receptacle and cover, of a resilient U-shaped handle, the arms of which have inturned ends terminating in up-turned prongs engaging the bottom of the receptacle, said arms having elongated longitudinally disposed loops therein providing fingers engaging within the rim of the receptacle, said arms having outward offsets therein at the bases of said fingers coacting therewith to clamp the rim of the receptacle.

4. The combination with a receptacle and cover, of a resilient U-shaped handle, the arms of which have inturned ends terminating in up-turned prongs engaging the bottom of the receptacle, said arms having elongated longitudinally disposed loops therein providing fingers engaging within the rim of the receptacle.

5. As an article of manufacture, a resilient U-shaped receptacle handle, the arms of which have inturned ends terminating in up-turned prongs adapted to engage the bottom of a receptacle, said arms having elongated longitudinally disposed loops therein providing rim engaging fingers and triangular inwardly projecting cover retaining loops at the upper ends of said fingers, said cover retaining loops being disposed with their bases downwardly and their apexes approximately in the plane of the arms of the handle facilitating the engagement of a cover therewith, said arms having outward offsets therein at the bases of said fingers coacting therewith to clamp the rim of a receptacle.

6. As an article of manufacture, a resilient U-shaped receptacle handle, the arms of which have elongated longitudinally disposed loops therein providing rim engaging fingers and triangular inwardly projecting cover retaining loops at the upper ends of said fingers, said cover retaining loops being disposed with their bases downwardly and their apexes approximately in the plane of the arms of the handle facilitating the engagement of a cover therewith.

7. As an article of manufacture, a resilient U-shaped receptacle handle, the arms of which have inturned ends terminating in up-turned prongs adapted to engage the bottom of a receptacle, said arms having elongated longitudinally disposed loops therein providing rim engaging fingers and inwardly projecting cover retaining loops at the bases of said fingers, said arms having outward offsets therein at the bases of said fingers coacting therewith to clamp the rim of a receptacle.

8. As an article of manufacture, a resilient U-shaped receptacle handle, the arms of which have elongated longitudinally disposed loops therein providing rim engaging fingers and inwardly projecting cover retaining loops at the bases of said fingers, said arms having outward offsets therein at the bases of said fingers coacting therewith to clamp the rim of a receptacle.

In witness whereof, I have hereunto set my hand.

EUGENE F. BRINDLE. [L. S.]